(12) United States Patent
Williamson

(10) Patent No.: US 6,644,738 B2
(45) Date of Patent: Nov. 11, 2003

(54) AIRCRAFT PASSENGER SEAT FRAME CONSTRUCTION

(75) Inventor: John Williamson, Burlington, CT (US)

(73) Assignee: B E Aerospace, Inc., Wellington, FL (US)

( * ) Notice: Subject to any disclaimer, the term of this patent is extended or adjusted under 35 U.S.C. 154(b) by 0 days.

(21) Appl. No.: 09/990,662

(22) Filed: Nov. 21, 2001

(65) Prior Publication Data

US 2003/0094838 A1 May 22, 2003

(51) Int. Cl.$^7$ ............................................. A47C 15/00
(52) U.S. Cl. ................... 297/232; 297/216.1; 297/248; 297/216.2; 244/122 R
(58) Field of Search .......................... 297/248, 216.13, 297/216.1, 216.14, 216.15, 216.19, 216.16, 163, 216.2, 232; 244/122 R

(56) References Cited

U.S. PATENT DOCUMENTS

| 4,229,040 A | * | 10/1980 | Howell et al. ............ 297/440.1 |
| 4,375,300 A | * | 3/1983 | Long et al. .................. 297/232 |
| 4,440,441 A | * | 4/1984 | Marrujo et al. .......... 297/216.2 |
| 4,718,719 A | * | 1/1988 | Brennan ................... 297/216.2 |
| 4,911,381 A | * | 3/1990 | Cannon et al. ......... 244/122 R |
| 5,069,505 A | * | 12/1991 | Amthor et al. .......... 297/216.2 |
| 5,522,640 A | * | 6/1996 | Bilezikjian ............... 297/216.2 |

* cited by examiner

Primary Examiner—Anthony D. Barfield
Assistant Examiner—Erika Garrett
(74) Attorney, Agent, or Firm—Adams Evans P.A.

(57) ABSTRACT

A passenger seat frame assembly, including a seat bottom chassis including a plurality of leg modules and section assembly modules. The leg modules are attached to fixed, spaced-apart attachment points on a supporting surface, such as the deck of an aircraft fuselage. A plurality of beam elements are carried by the leg modules and section assembly modules. A plurality of clamp joints are provided for being positioned on the plurality of leg modules and for receiving the plurality of beam elements in spaced-apart relation to each other for defining a ladder frame assembly having a specified width and seat spacing.

11 Claims, 16 Drawing Sheets

AIRCRAFT PASSENGER SEAT FRAME CONSTRUCTION

TECHNICAL FIELD AND BACKGROUND OF THE INVENTION

Figure 1:
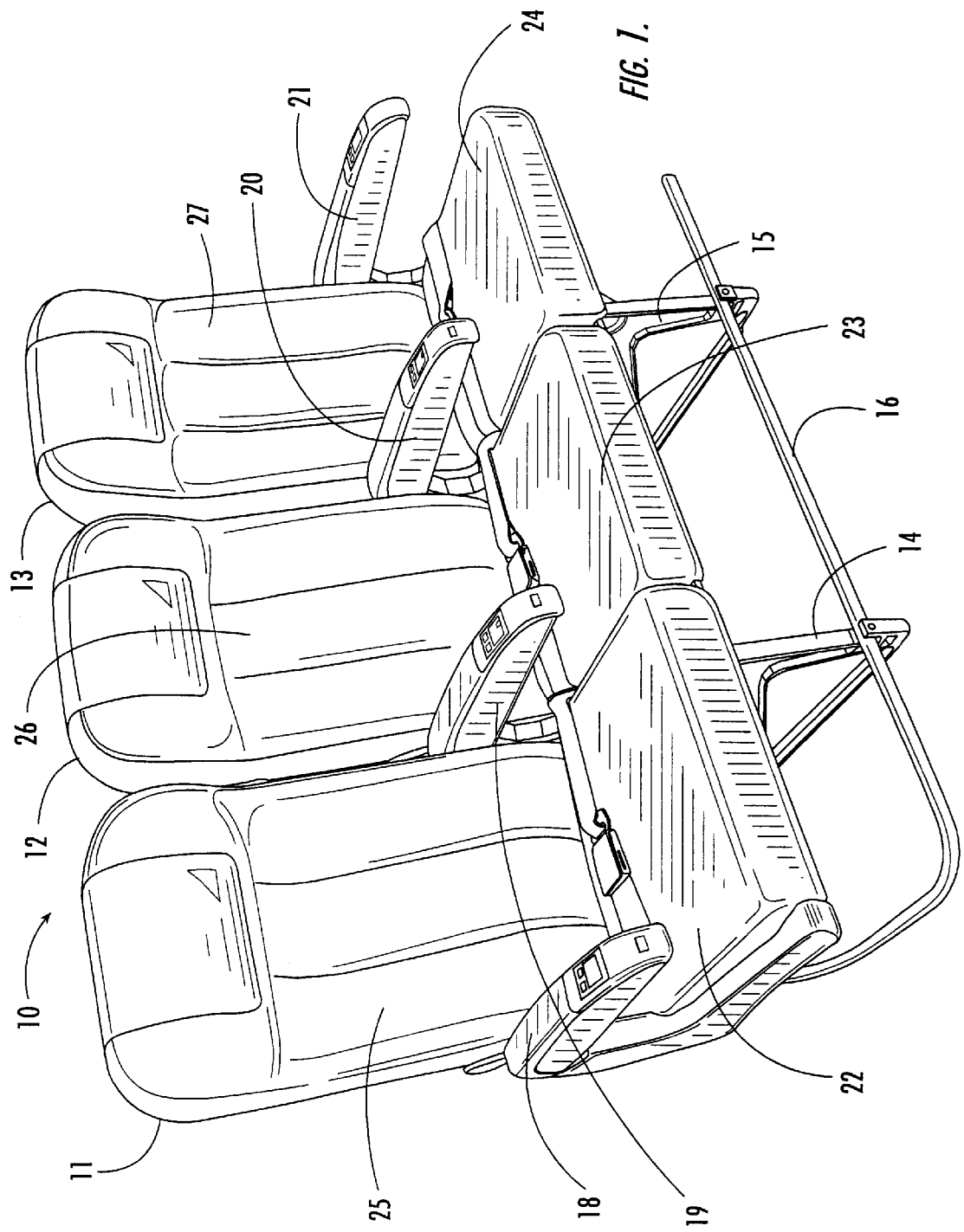

This invention relates to a seat frame construction, particularly one for use with an aircraft passenger seat. Aircraft passenger seats are constructed from modular components, the size, weight and construction of which are dictated by many considerations, including fuselage dimensions, aesthetic and safety considerations. Many of these requirements are imposed by law or regulation. The lower seat chassis is constructed of leg modules, while the upper seat is constructed of section assembly modules. In prior art seating systems the leg modules and section assembly modules are connected by mounting both to a series of parallel beams which extend laterally from one side of the seat or seat assembly to the other.

The location of the upper seat section modules is controlled by the aircraft fuselage lines, statutory aisle requirements and carrier preferences within these parameters. The location of the leg modules is governed by the positions of the floor tracks which extend along the length of the fuselage and to which the seats are secured by track fittings on the bottom of the leg modules. The position of the floor tracks is generally fixed and permanent.

The variable position of the seats and the fixed lateral location of the legs relative to the floor tracks thus has required the fabrication of numerous parts intended particularly for a given seat for a given location. Many of these parts are fabricated for a specific location by the placement of holes in the components to attach them together, rendering them unusable in other positions within the aircraft. Prior art designs thus produce waste and inefficiency.

SUMMARY OF THE INVENTION

Therefore, it is an object of the invention to provide a passenger seat frame assembly which includes a minimum number of modular elements.

It is another object of the invention to provide a passenger seat frame assembly which permits a single configuration of a lateral beam element of the seat to be used for seats having various configurations and spacings.

It is another object of the invention to provide a passenger seat frame assembly which eliminates or reduces the need to drill attachment holes in beam elements specific to particular seat configurations and spacings.

It is another object of the invention to provide a passenger seat frame assembly which permits the beam elements to be attached to the leg module and section assembly module solely by clamping.

These and other objects of the present invention are achieved in the preferred embodiments disclosed below by providing a passenger seat frame assembly, comprising a seat bottom chassis including a plurality of leg modules and section assembly modules. The leg modules are attached to fixed, spaced-apart attachment points on a supporting surface, such as the deck of an aircraft fuselage. A plurality of beam elements are carried by the leg modules and section assembly modules. A plurality of clamp joints are provided for being positioned on the plurality of leg modules and for receiving the plurality of beam elements in spaced-apart relation to each other for defining a ladder frame assembly having a specified width and seat spacing.

According to one preferred embodiment of the invention, the clamp joint comprises an elongate attachment element for being attached to an upper portion of the leg module.

According to another preferred embodiment of the invention, the clamp joint comprises a beam collar for extending upwardly above the leg module for receiving a beam element.

According to another preferred embodiment of the invention, the beam collar includes a split therein from one lateral side to another for enabling the beam collar to assume a relatively large diameter position for receiving the beam therethrough.

According to yet another preferred embodiment of the invention, the beam collar includes tightening means for closing the split with the beam positioned therein to reduce the diameter of the beam collar and thereby clamp the beam therein against axial and rotational movement.

According to yet another preferred embodiment of the invention, the beam collar includes a threaded bolt extending though a matingly threaded hole through the joint clamp from one side of the split to the other for increasing and decreasing the diameter of the beam collar as the bolt is turned to thus loosen or tighten the grip of the beam collar on the beam.

According to yet another preferred embodiment of the invention, the clamp joint comprises an elongate attachment element for being attached to an upper portion of the leg module, the attachment element having a tapered end portion with a hole therein for receiving a fastener therethrough for attaching the attachment element to the leg module, an enlarged intermediate portion having a pair of spaced-apart holes therein for receiving respective fasteners therethrough for attaching the attachment element to the leg module, and a beam collar formed on an end of the attachment end remote from the tapered end portion for extending above the leg module and receiving a beam therethrough.

According to yet another preferred embodiment of the invention, the attachment element includes a web element between the hole in the tapered end portion and the pair of holes in the intermediate portion, the web element having a weight-reducing void therein.

According to yet another preferred embodiment of the invention, a passenger seat is provided, comprising a seat frame assembly which includes a seat bottom chassis including a plurality of leg modules and section assembly modules. The leg modules are attached to fixed, spaced-apart attachment points on a supporting surface. A plurality of beam elements are provided for being carried by the leg modules. A plurality of clamp joints for being positioned on the plurality of leg modules and section assembly modules. The clamp joints clamp the plurality of leg modules in spaced-apart relation to each other on the beam elements for defining a ladder frame assembly without the need to penetrate the beam elements with holes for receiving fastener elements such as screws or bolts. A seat bottom pan and a seat back pan are carried by the frame assembly. A seat bottom cushion is carried by the seat bottom pan and a seat back cushion is carried by the seat back pan.

According to yet another preferred embodiment of the invention, the seat includes an upholstery seat bottom dress cover positioned on the seat bottom and an upholstery seat back dress cover positioned on the seat back.

According to yet another preferred embodiment of the invention, the seat includes a meal tray carried by an aft-facing side of the seat back pan and movable between a stowed position against the seat back pan and a lowered, horizontal use position.

An embodiment of the method of mounting a passenger seat to attachment points on a supporting surface according to the invention comprises the steps of providing a seat bottom chassis including a plurality of leg modules and section assembly modules, the leg modules for being attached to fixed, spaced-apart attachment points on a supporting surface. A plurality of clamp joints are provided for receiving the plurality of beam elements therethrough. A plurality of beam elements is provided for being carried by the leg modules and section assembly modules. First and second ones of the plurality of clamp joints are positioned on each of the leg modules, and first and second beam elements are positioned laterally through the respective first and second clamp joints to attach the leg modules together in spaced-apart relation to each other. A section assembly module is positioned on the beam elements adjacent each leg module.

DESCRIPTION OF THE PREFERRED EMBODIMENT AND BEST MODE

Seat Assembly Overview

Figure 2:
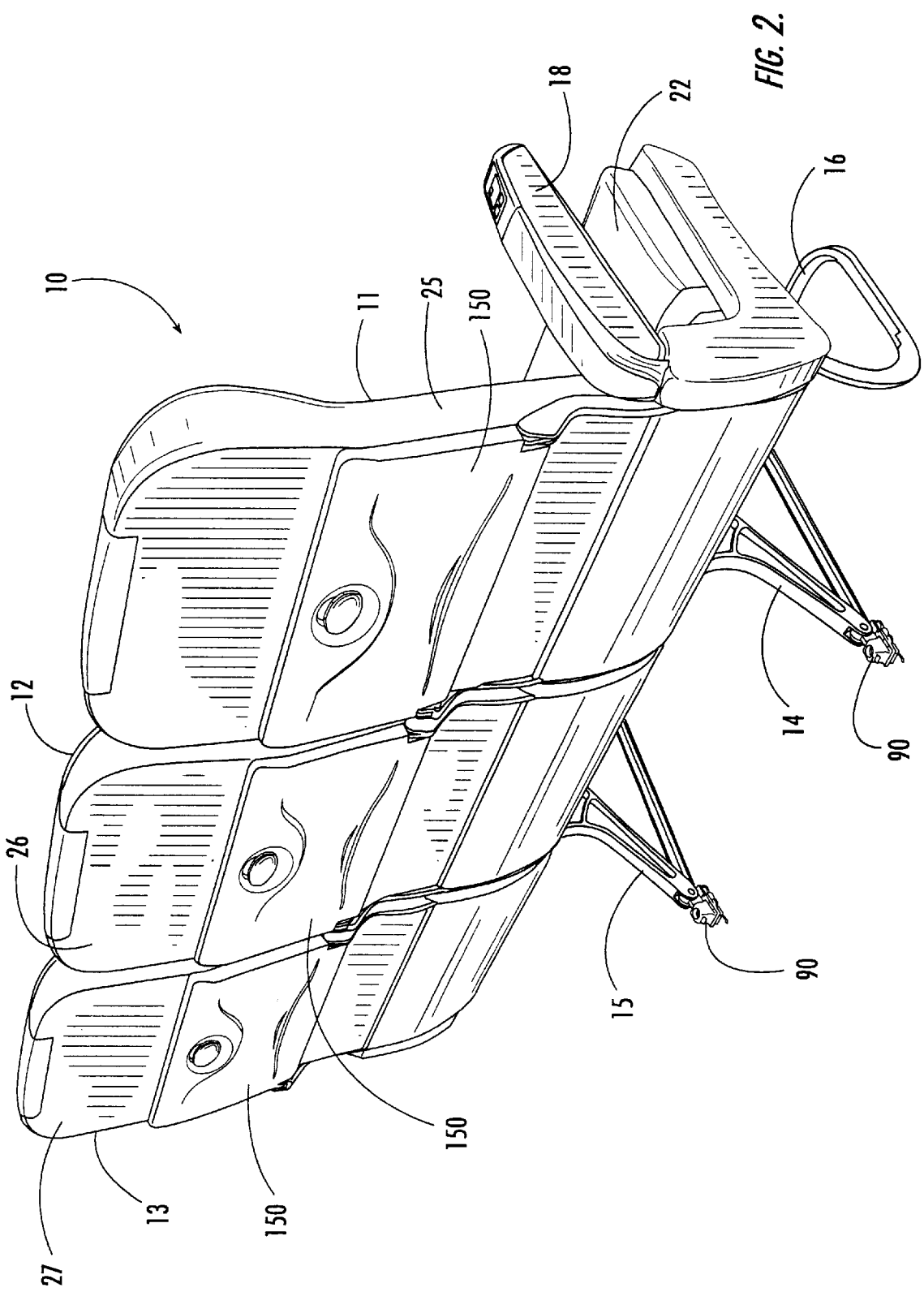
Figure 3:
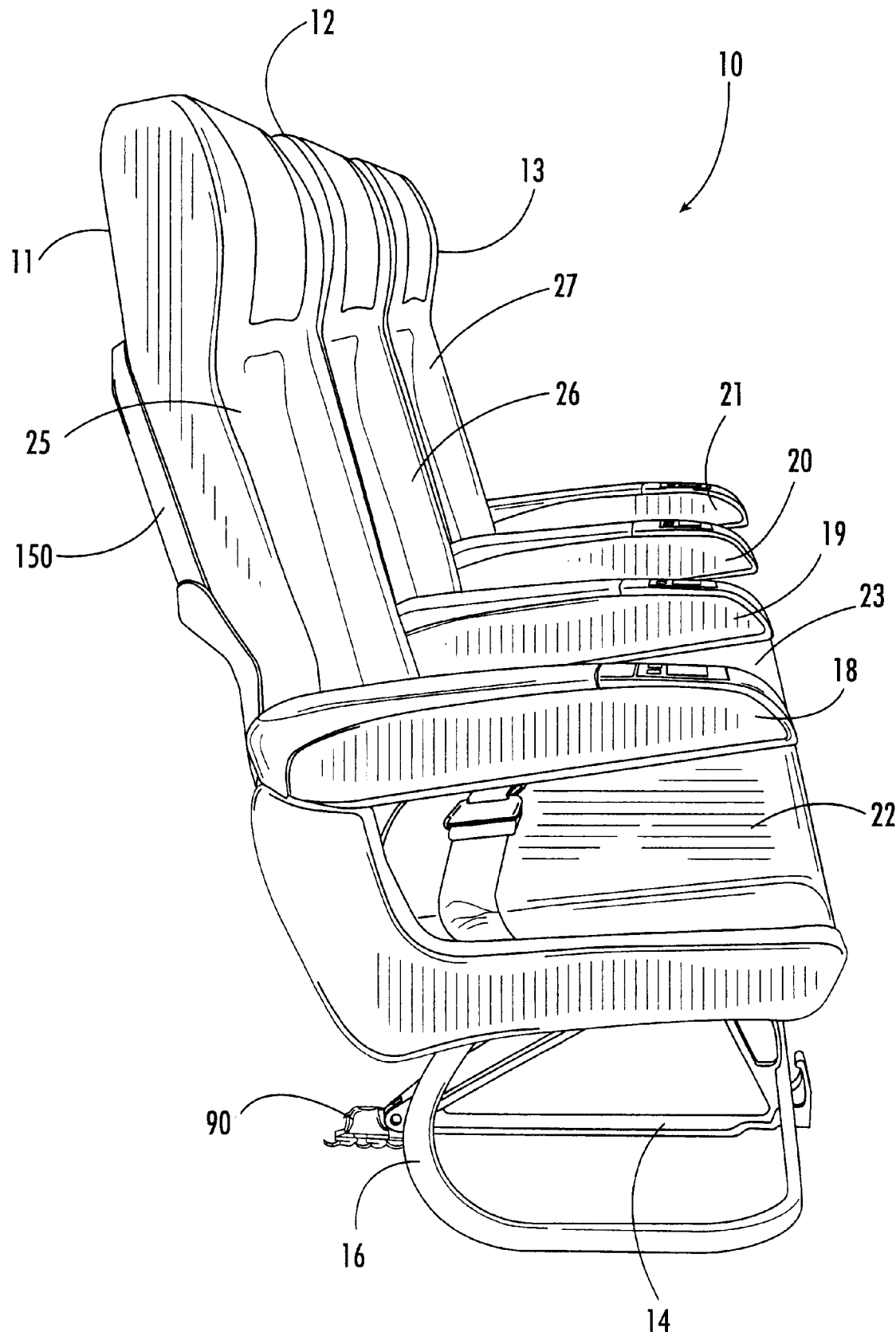

Referring now specifically to the drawings, an aircraft passenger seat set according to the present invention is illustrated in FIGS. 1, 2 and 3 and shown generally at reference numeral 10. In the particular embodiment shown in FIGS. 1, 2 and 3, the seat set 10 is comprised of three adjacent seats, an aisle seat 11, a center seat 12 and a window seat 13. The seat set 10 is supported on a pair of leg modules 14 and 15, and includes a baggage guard rail 16. The seats 11, 12 and 13 are provided with arm rests 18, 19, 20 and 21. The seats 11, 12 and 13 include seat bottoms 22, 23 and 24, respectively, and seat backs 25, 26 and 27, respectively.

Figure 4:
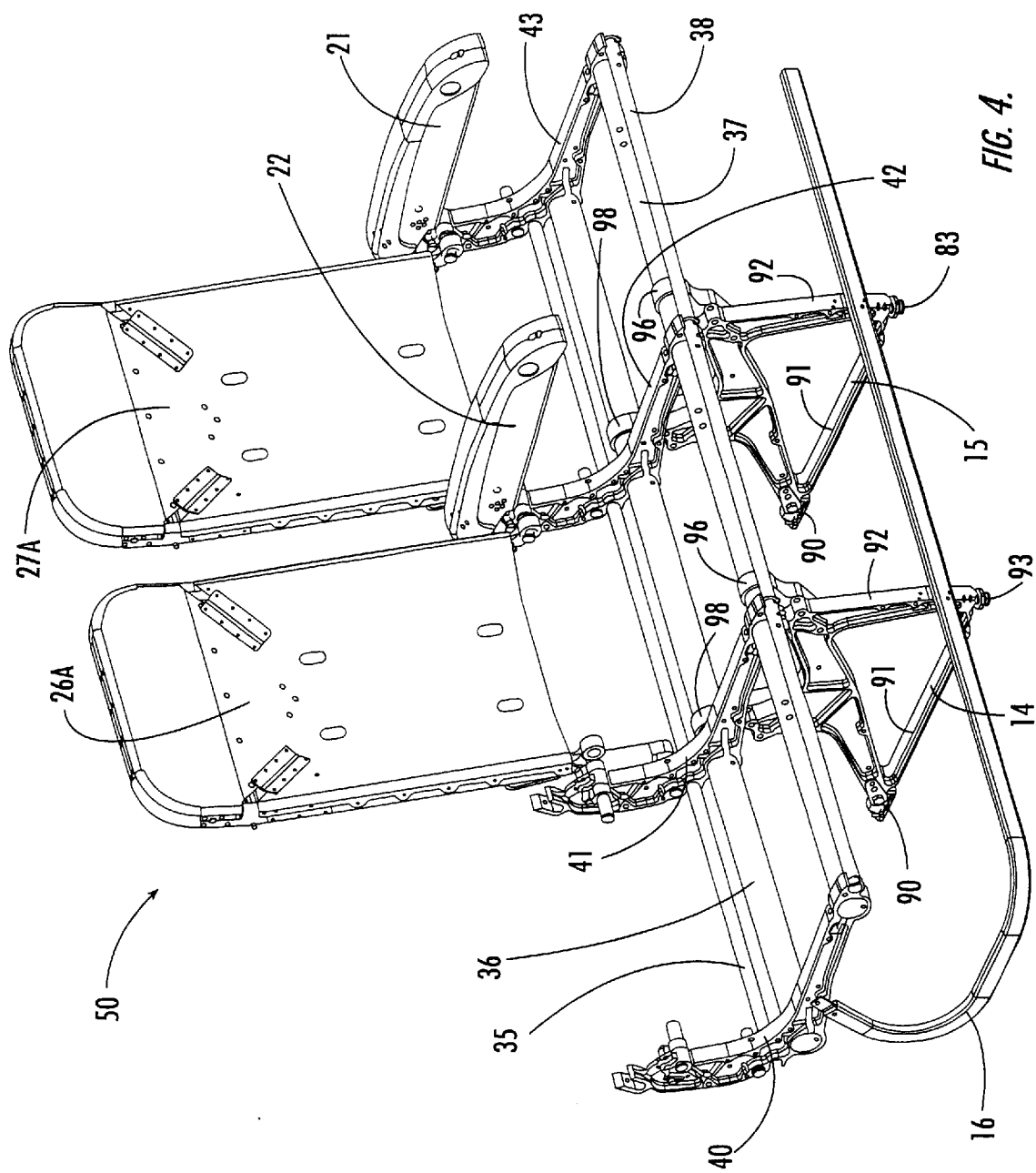
Figure 5:
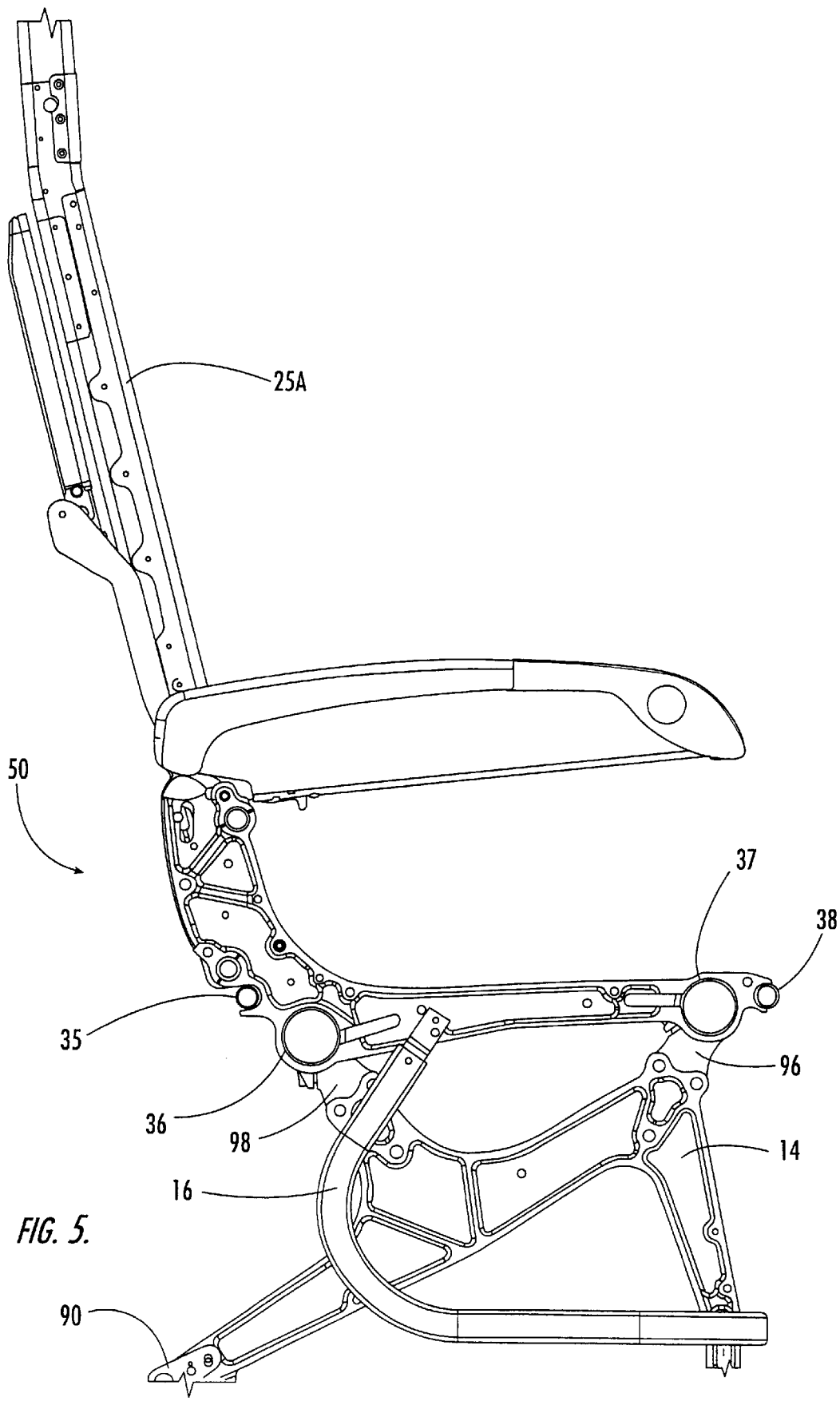

The internal structure of the seat set is shown in FIG. 4, with various parts eliminated for clarity. As is shown, the seat set 10 is supported on and thus shares the two leg modules 14 and 15. The leg modules 14 and 15 carry a set of four laterally-extending beam elements 35, 36, 37 and 38 on which are mounted four section assembly modules 40, 41, 42 and 43. The leg modules 14, 15; beam elements 35, 36, 37 and 38; and the section assembly modules 40, 41, 42 and 43 tie together the components in a manner necessary to form a seat set 10 having significant structural integrity within passenger comfort, fuselage size and government regulation requirements. The underlying structure defined by leg modules 14, 15; beam elements 35, 36, 37 and 38; and the section assembly modules 40, 41, 42 and 43 is referred to as a "ladder frame assembly" and is indicated at reference numeral 50 in FIGS. 4 and 5. The ladder frame assembly 50 carries seat back pans 26A, 27A, see FIG. 4, and seat back pan 25A, see FIG. 5.

Of course, the seats according to the present invention can be integrated together to form seat sets of different lengths, spacings, and numbers of seats. Whether one, two, three or more seats, each seat set 10 will include at least two leg modules, such as leg modules 14 and 15. Thus, when a seat is referred to as having a pair or a plurality of leg modules, it is understood that at least two leg modules are required, but that the two leg modules may not necessarily be on opposing sides of any particular seat. For example, in FIGS. 1–5, three seats 11, 12 and 13 are each supported on two leg modules 14, 15. Thus, seat 11 is supported on two leg modules 14, 15, just as are seats 12 and 13, and whether the seat set 10 is considered a "seat" or the three seats 11, 12 and 13 are considered "seats", in either case they are supported by a plurality of legs.

Low Profile Seat Back Recline Locking Assembly

Figure 6:
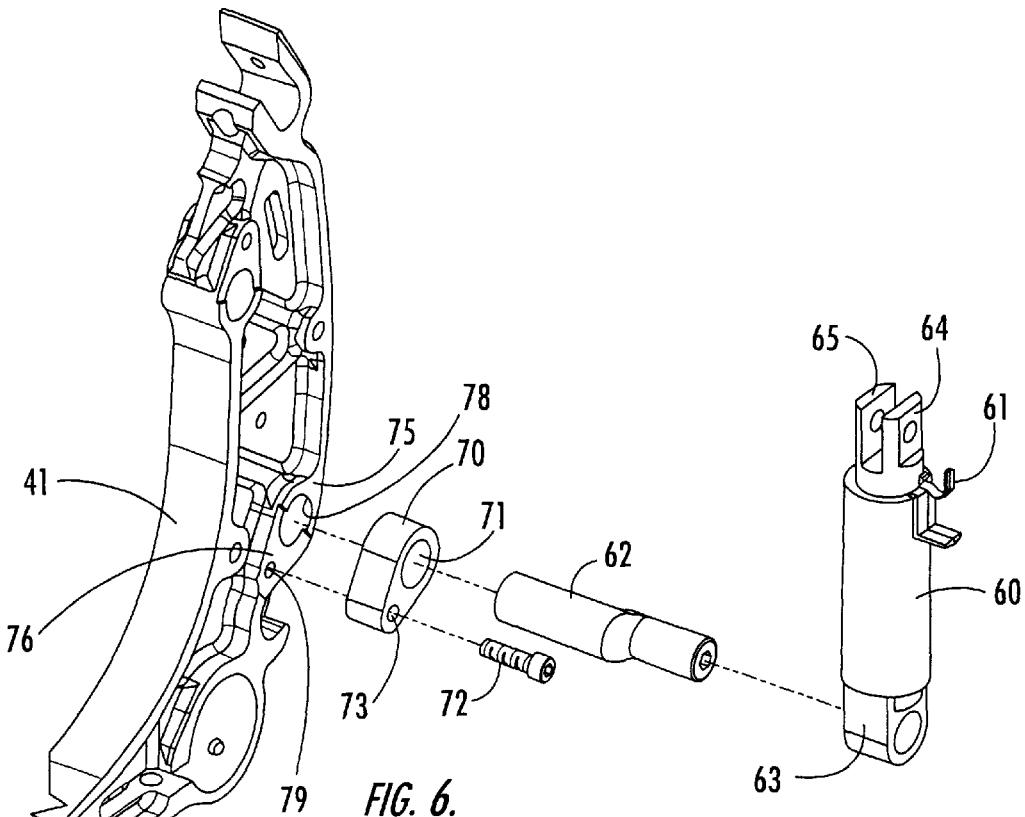
Figure 7:
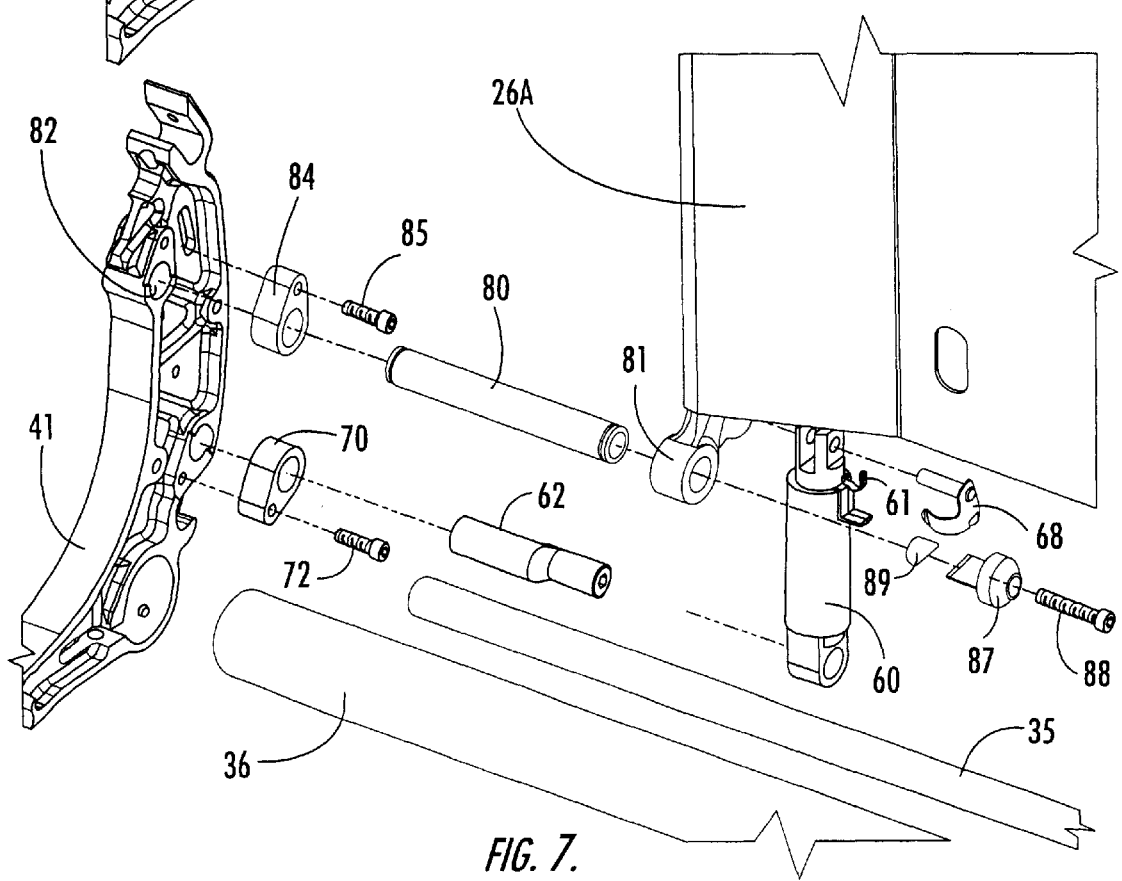

Referring now to FIGS. 6 and 7, a low profile seat back recline locking assembly is shown. A hydraulic cylinder 60 interconnects the section assembly module 41 and the seat back pan 25A. A control button, not shown, on the arm rest 19 can be depressed by the seat occupant to vary the recline angle of the seat back 26 relative to the seat bottom 23. The control button is connected to a control cable, not shown, which connects to the actuator 61 residing on top of the cylinder 60. When the control button is depressed, the actuator 61 unlocks the cylinder 60. Backward pressure on the seat back pan 25A allows the seat back pan 25A to recline. Release of back pressure on the seat back pan 25A by the seat occupant allows the seat back pan 25A to move forwardly to a more upright position. Release of the control button locks the seat back 25 in the current position.

The cylinder 60 is mounted for pivotal movement to the section assembly module by an offset pivot shaft 62 by a lower cylinder pivot bushing 63 and to the seat back pan 25A by a pair of upper cylinder pivot bushings 64, 65 between which fits a pivot bushing, not shown, residing behind the lower extent of the seat back pan 25A. The upper cylinder pivot bushings 64, 65 are locked in place by a lock pin 68, designed to be removable without tools.

The pivot shaft 62 is locked to the section assembly module 41 by a pear-shaped spacer collar 70 having a bore 71 into which the pivot shaft 62 extends. The spacer collar 70 is connected to the section assembly module 41 by a screw 72 which is threaded into a matingly threaded screw hole 73 in the small end of the spacer collar 70.

Note that the spacer collar 70 fits against a stepped surface portion of the section assembly module 41. The stepped surface portion includes a first portion 75 which is flush with the surrounding surface of the section assembly module 41 and a second portion 76 which is recessed below the surrounding surface of the section assembly module 41. The pivot shaft fits into a bore 78 in the section assembly module 41, and the screw 72 threads into a matingly threaded hole 79.

Thus, in order to lock the pivot shaft 62 against movement relative to the section assembly module 41, the screw 72 is tightened to the point where the smaller end of the spacer collar 70 is drawn inwardly into the recessed portion 76 of the section assembly module underlying the spacer collar 70. This tilting movement creates a misalignment of the axis of the spacer collar 70 relative to the axis of the pivot shaft 62, thus locking the pivot shaft 62 against both axial and rotational movement relative to the section assembly module 41. As the seat back pan 25A moves, the cylinder 60 pivots about the pivot shaft 62.

Similarly, the seat back pivot shaft 80 is mounted in a pivot bushing 81 on the seat back pan 25A and in a bore 82 in the section assembly module 41. The seat back pivot shaft 80 is locked to the section assembly module 41 by a spacer collar 84. In the same manner as described above, the spacer collar 84 sits over a stepped portion of the surface of the section assembly module 41, so that when the screw 85 is tightened, the small end of the spacer collar 84 is misaligned, locking the seat back pivot shaft 80 in a fixed position relative to the section assembly module 41.

The spacer collars 70 and 84 are preferably manufactured from extrusion and thus can be easily made in any desired thickness.

The seat back pivot shaft 80 is attached to the pivot bushing by a fastener 87. A screw 88 is threaded into the fastener 87, which includes a misaligned portion 89. As the screw 88 is tightened, the misaligned portion 89 becomes progressively more misaligned, securing the seat back pivot shaft 80 to the pivot bushing 81 of the seat back pan 25A.

As is shown in FIG. 7, beam elements 35 and 36 carry the section assembly module 41, also as shown in FIG. 4, together with the beam elements 37 and 38.

The cylinder 60 is very compact—approximately 5 inches between attachment points, and has a ½ inch stoke. By locating the actuator 61 astride the cylinder 60, the overall length is further reduced. This shorter length allows the cylinder 60 to be located in a nearly vertical position to one side of and behind the seat occupant. The seat bottom pan therefore has a clean appearance without local protuberances. As a result, the bottom cushion can be thinner, less complex, more comfortable and lighter than those in current use. Recline of the seat back 26 is unaffected, and is completely transparent to the seat occupant.

Seat Frame Construction

Figure 8:
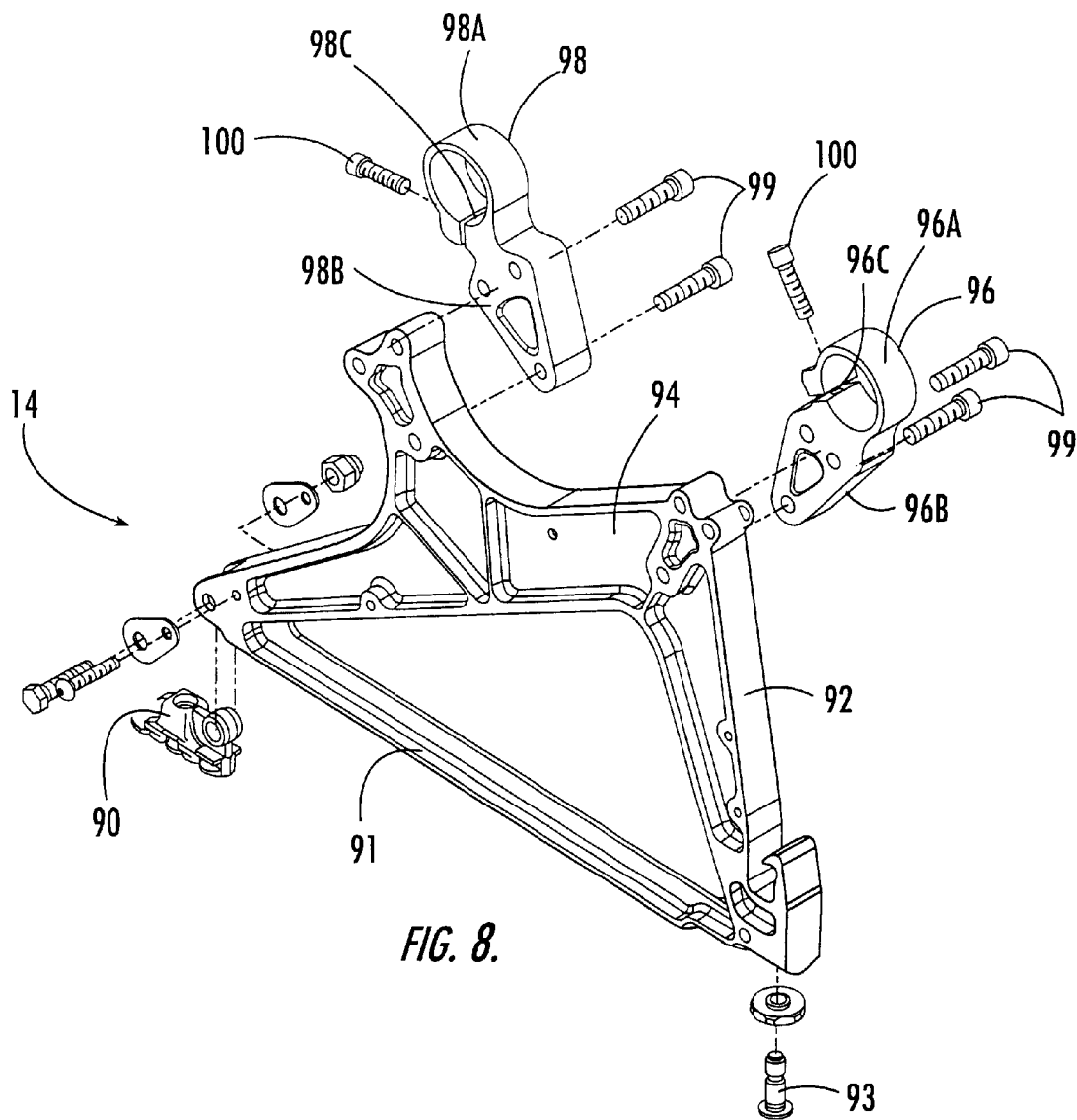

Referring now to FIG. 8, leg module 14 is described in further detail. Leg module 14 includes a rear floor track fitting 90 by which the seat set 10 is attached to a track extending along the fuselage deck from front to rear, a floor tie assembly 91, a front leg 92, a front track fitting 93, and a diagonal leg tie 94. A pair of joint clamps 96, 98 are provided and comprise an annular collar element 96A, 98A, respectively, which receive the beam elements 37, 36, and attachment elements 96B, 98B, respectively, by which the joint clamps 96, 98 are attached to the leg module 14.

The joint clamps 96, 98 are secured by screws 99 to the top of the front leg 92 and the diagonal leg tie 94, respectively. The joint clamps 96, 98 include axially-extending splits 96C, 98C, respectively, which permit the collar elements 96B, 98B to be spread sufficiently to permit insertion of the beam elements 37, 36. Screws 100 permit the collar elements 96B, 98B to be tightened for locking the beam elements 37, 36 in place in a predetermined position, and loosened for permitting the beam elements 37, 36 to the removed from or shifted axially within the collar elements 96B, 98B.

As shown in FIG. 4, the section assembly modules 41 and 42 are mounted to the beam elements 37, 36 in an offset position relative to the joint clamps 96, 98 and form the ladder frame assembly 50.

Figure 9:
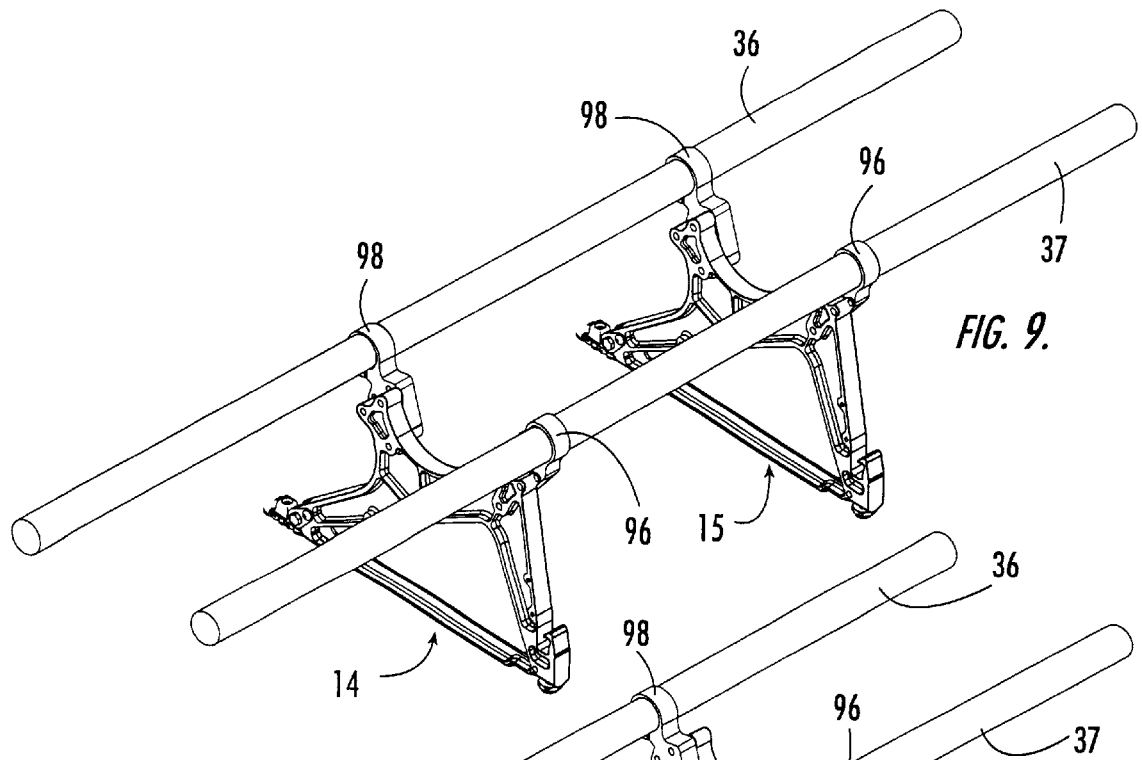
Figure 10:
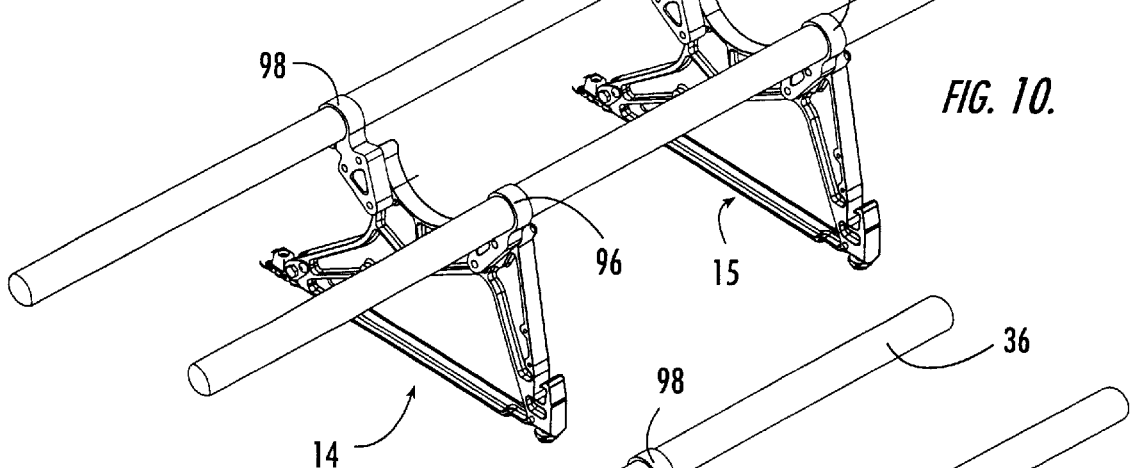
Figure 11:
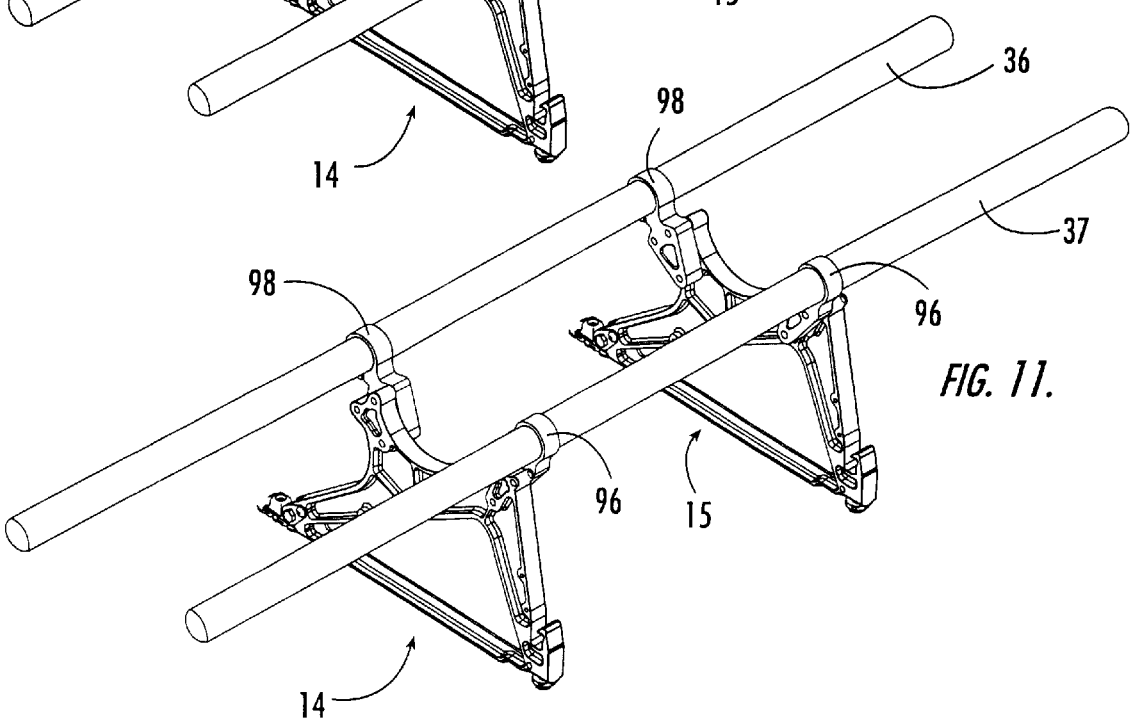

Referring now to FIGS. 9, 10 and 11, the manner in which the joint clamps 96, 98 may be used to vary seat spacing is illustrated. As noted above, spacing between parallel sets of floor tracks is generally fixed, so that the need to have seats with varying spacing in prior art constructions has been accommodated by having differently-constructed leg modules with various offsets to the left or right of the centerline of the leg module. By using the joint clamps 96, 98, seat spacing is varied using the same components, avoiding the need to have a number of differently-constructed leg modules and components. For example, in FIG. 9 the joint clamps 96, 98 are positioned on the right side of the leg modules 14, 15. The location of the collars 96A, 98A permit the section assembly modules 41, 42 to be positioned in vertical alignment with or to the left of the leg modules 14, 15.

In FIG. 10 the joint clamps 96, 98 are positioned on the left side of the leg modules 14, 15, permitting the section assembly modules 41, 42 to be positioned in vertical alignment with or to the right of the leg modules 14, 15.

In FIG. 11 the joint clamps 96, 98 are positioned inboard of the leg modules 14, 15, permitting the section assembly modules 41, 42 to be positioned in vertical alignment with or outboard of the leg modules 14, 15. Even though not shown, it is also apparent that the joint clamps can be both positioned outboard of the leg modules 14, 15, permitting the section assembly modules 41, 42 to be positioned in vertical alignment with or inboard of the leg modules 14, 15. The attachments are not permanent, so that modifications to the seat spacing requirements can be quickly and easily accomplished.

Seat Back Breakover Assembly

Referring now to FIGS. 12, 13, 13A–C and 14, a breakover assembly 100 for a passenger seat such as the passenger seat 11 is shown. The breakover assembly 100 is intended to normally prevent the seat back 25, see FIG. 5, from pivoting forward past an upright position towards the seat bottom 22, while allowing this movement if struck with a sufficiently hard forwardly-directed force, such as might occur if hit from the rear by an occupant seated directly behind the seat. The purpose of the breakover assembly 100 is to prevent damage to the seat 11 resulting from a severe rear impact and to at least reduce injury to an occupant thrown against the rear of the seat back by allowing the seat back to move forwardly in a controlled manner.

In general, this is effected by utilizing a bent steel wire to resist impact up to a certain predetermined load, and then absorb the energy by forcing the bend in the wire rearwardly relative to the wire, forwardly relative to the seat, and giving off excess energy in the form of heat.

Figure 12:
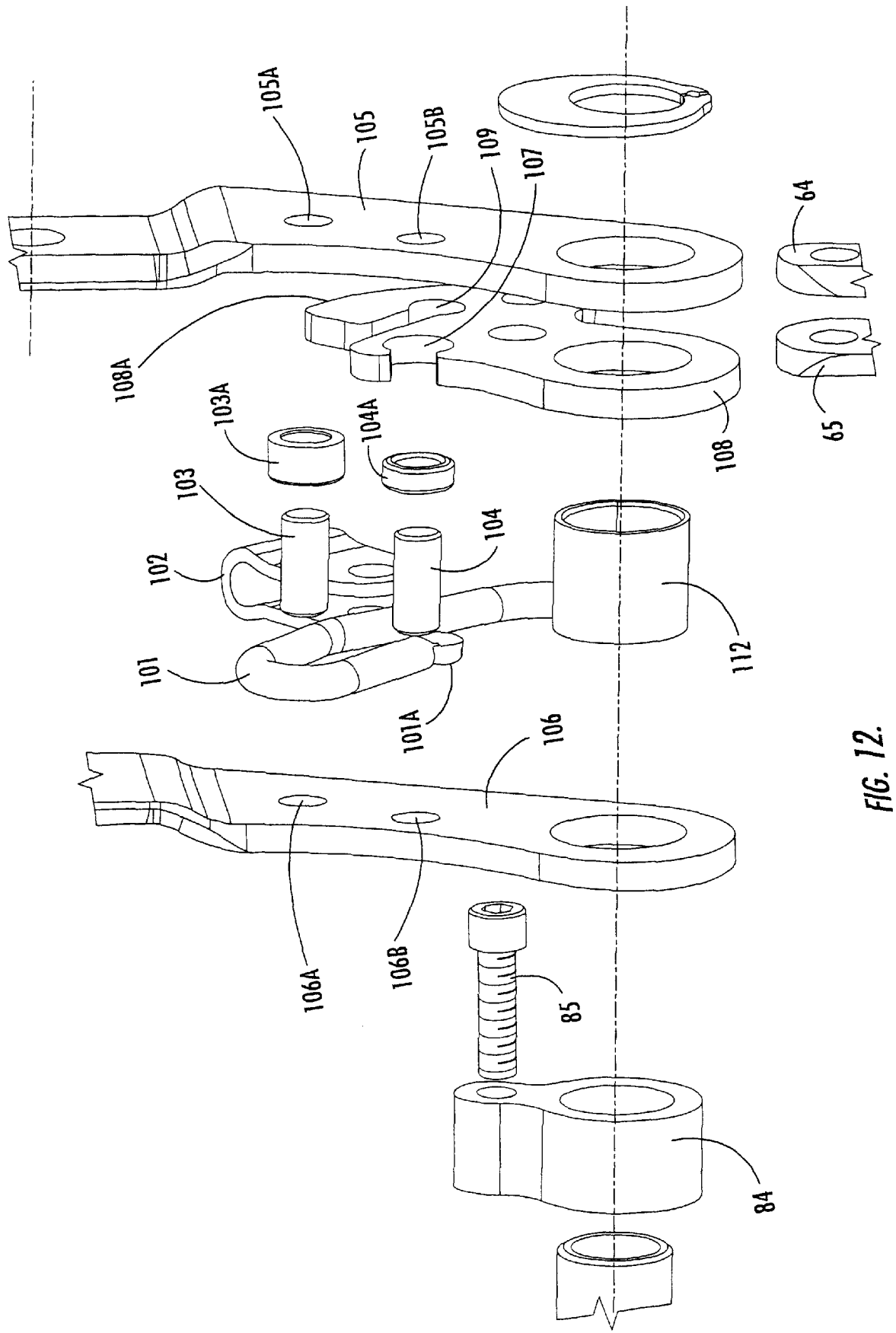
Figure 13:
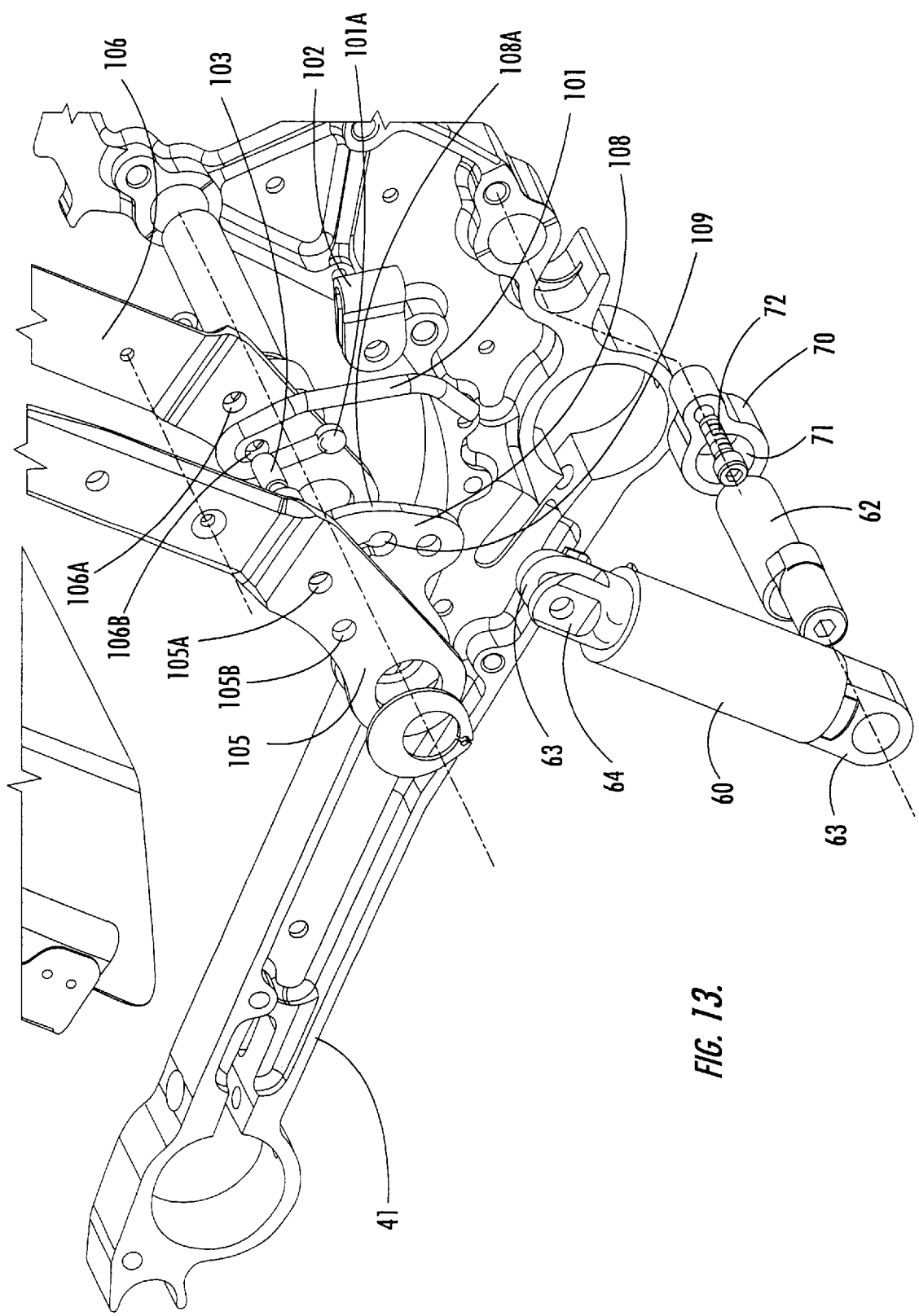
Figure 13A:
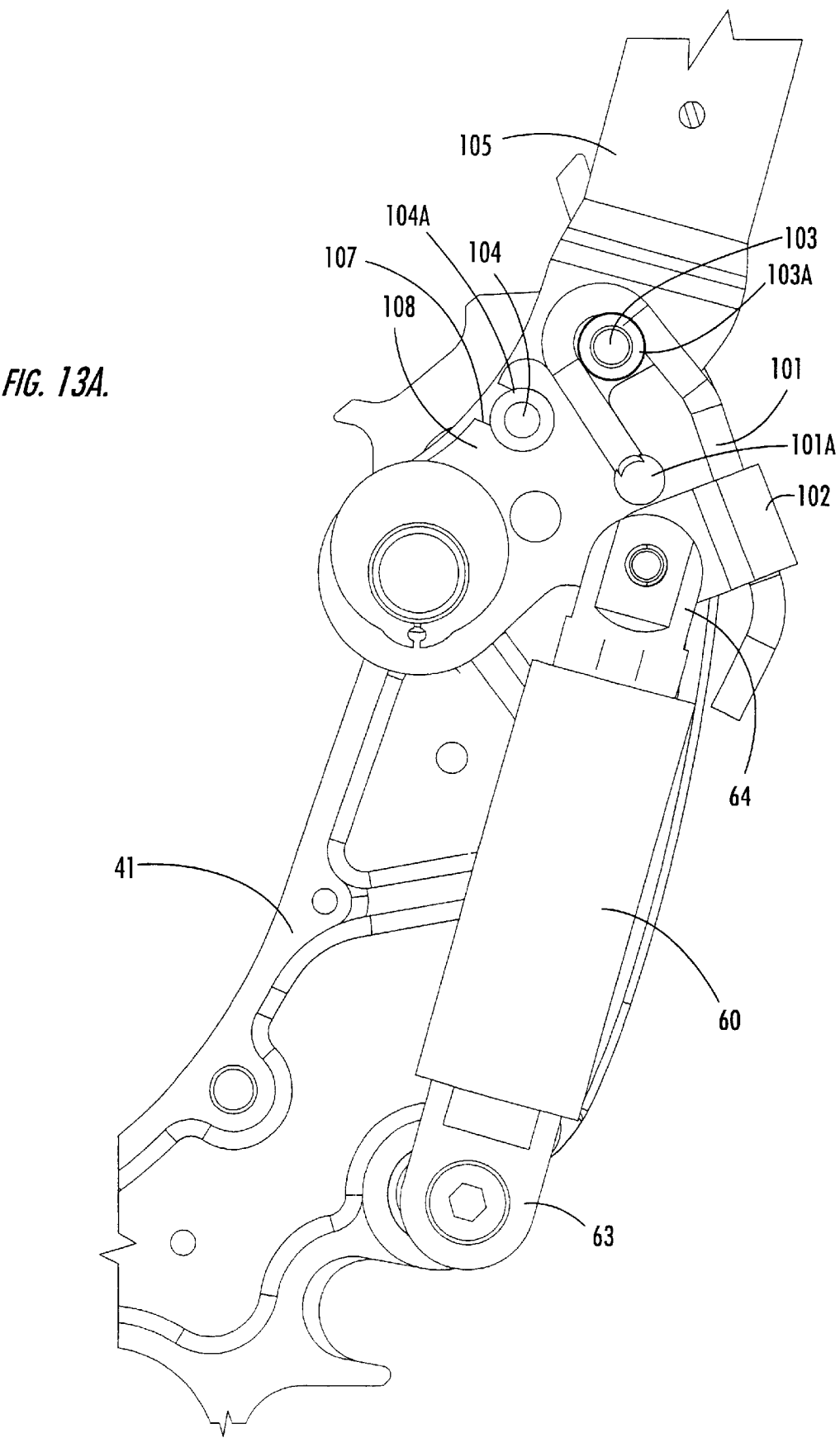
Figure 13B:
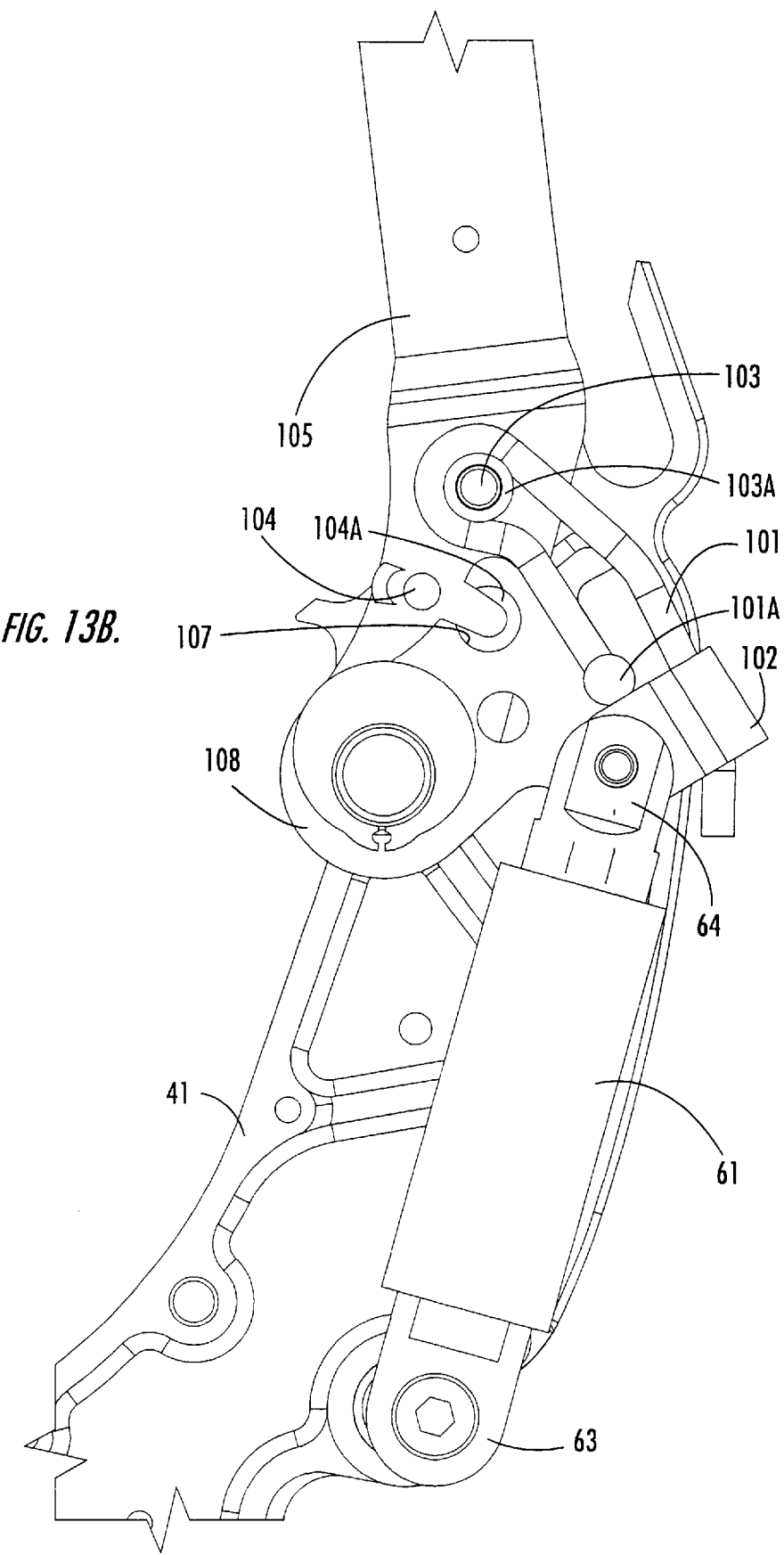
Figure 13C:
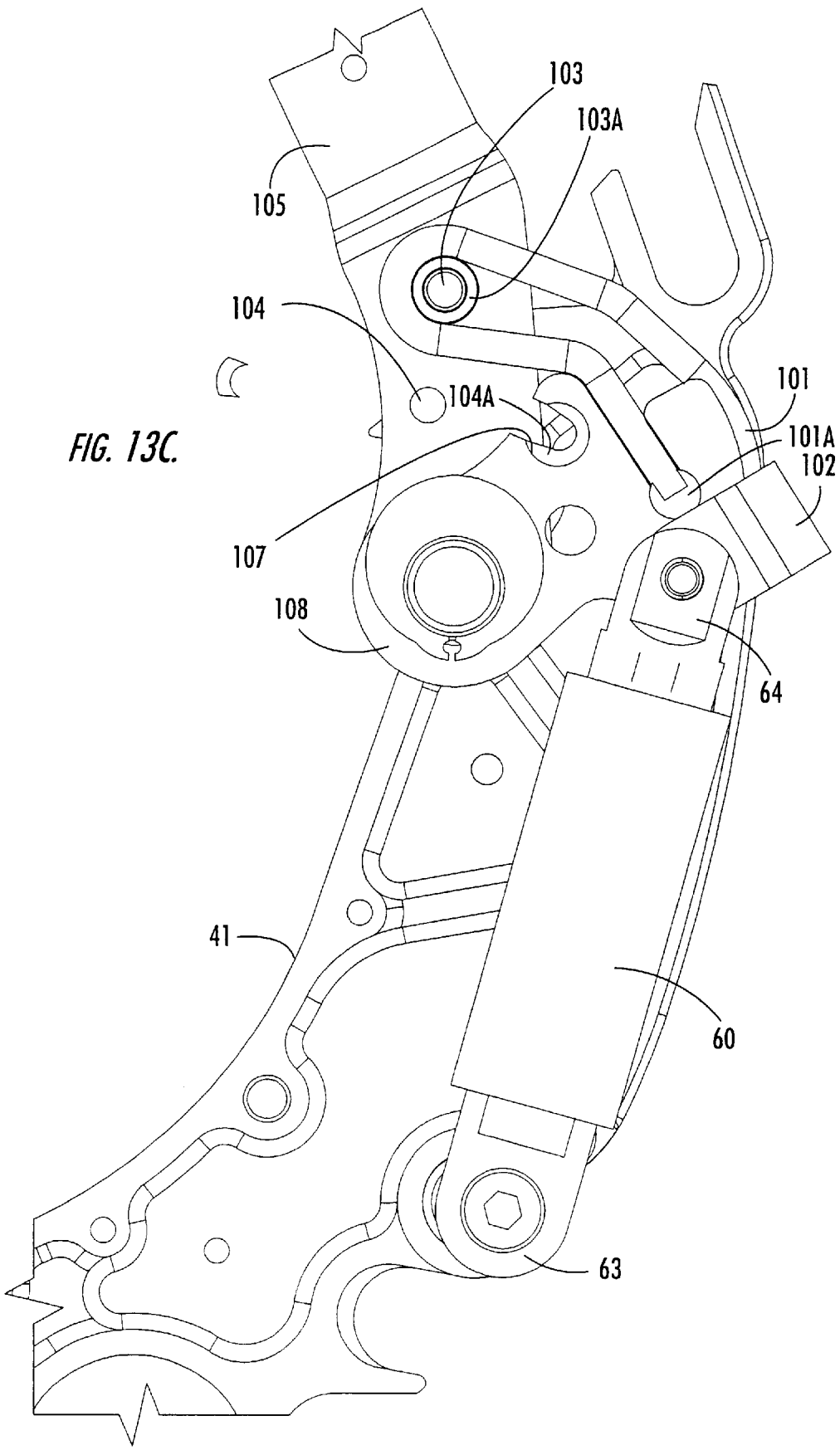
Figure 14:
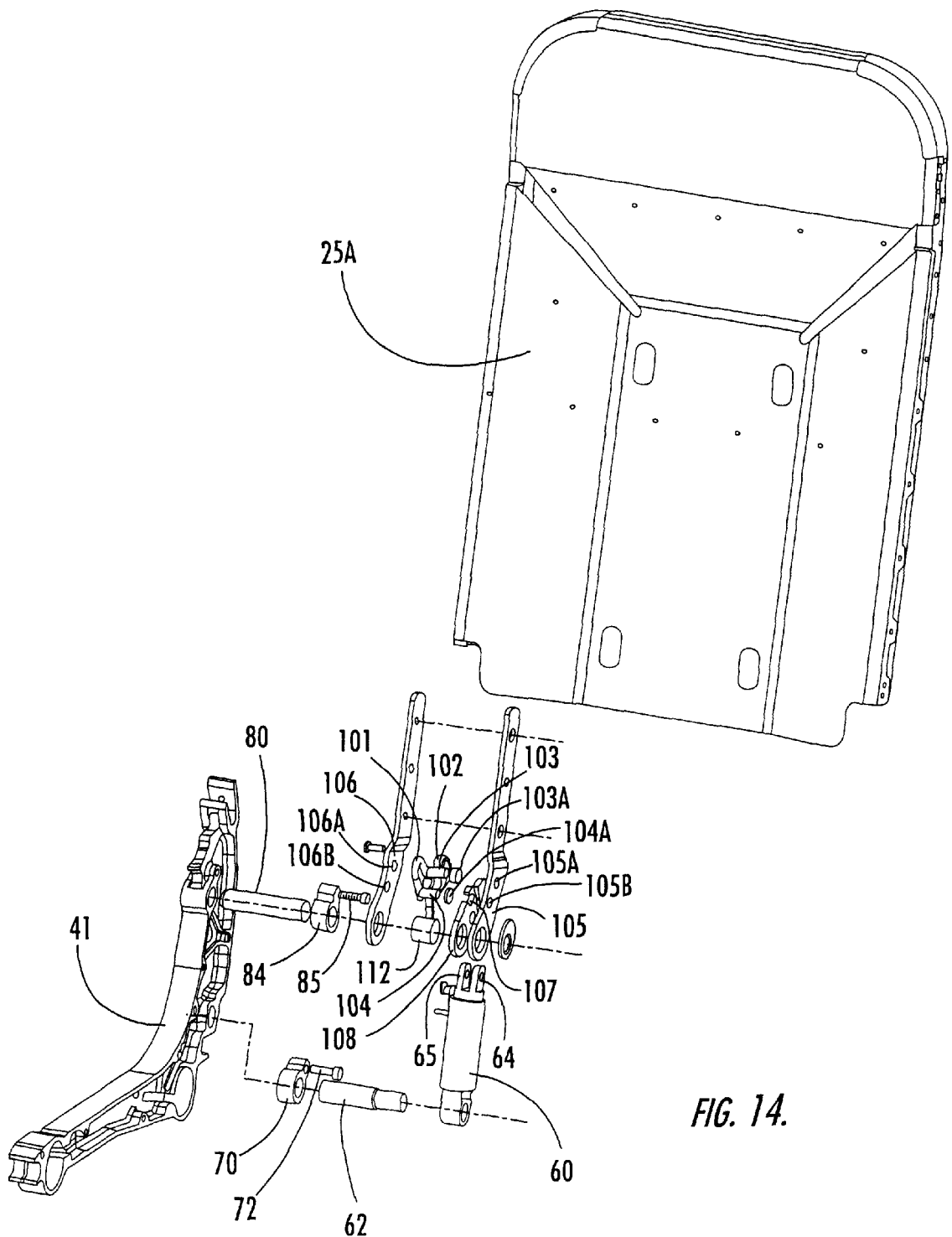

Specifically, a bent steel wire 101 as is shown in the simplified view of FIG. 12 is captured by a retainer bracket 102. The steel wire is a 0.235 inch 1018 grade wire. An energy-absorbing roller 103 and bushing 103A are positioned inside the bend of the steel wire 101. The roller 103 is captured in holes 105A and 106A in back supports 105, 106, respectively and thus must move in unison with the back supports 105, 106. The bushing 103A resides in lateral alignment with the steel wire 101 inside the bend.

A shear pin 104 carrying a shear bushing 104A thereon is captured in holes 105B and 106B in back supports 105, 105, respectively. The shear bushing 104A is captured in an annular recess 107 in a quadrant member 108. The steel wire 101 fits around the back side 108 of the quadrant member 108, with the forward portion of the wire 101 positioned in the elongate slot 109. The forward portion of the wire 101 is retained in slot 109 by an enlarged head 101A which fits within an annular recess at the end of the slot 109. See FIG. 13.

The entire seat back 25 pivots on the pivot bushing 112 on which the back supports 105, 106 and quadrant 108 are positioned. See FIG. 14. Other components shown are illustrated and described above.

In operation, an abnormal force, for example, the impact of a passenger on the rear of the seat during a 16 g event will cause the seat back 25 to move forward while the quadrant 108 remains stationary. The shear bushing 104A fits snugly within the recess 107 and thus quickly breaks. The shear bushing 104A is designed to break upon impact of between 180–220 pounds on the top of the seat back 25. See FIGS. 13A, 13B. The width of the shear bushing 104A can be varied, and in doing so the amount of force required to break the shear bushing 104A can be varied. The wire 101 is protected from any load until the shear bushing 104A breaks.

As the shear bushing 104A breaks, the seat back 25 continues forward, bringing the bushing 103A up against the back of the inside of the bend in the wire 101. As the seat back 25 continues forward, the bushing 103A continues forward, and the wire 101 is pulled around the bushing 103A, moving the position of the bend. See FIG. 13C. Energy is absorbed in two ways, movement of the position of the bend along the length of the wire 101 and heat released as the wire 101 thus bent.

Wire 101 is designed to begin movement at 150 pounds of force, and permits the seat back 25 to move through a maximum arc of 70 degrees. The combined use of the sacrificial bushing 104A and the wire 101 controls the movement of the seat back 25 in such a manner that survivability of the passenger is improved at an impact force as low as 1G. The seat back 25 can be returned to its normal position by pushing it rearward using less than a 35 lbs force.

When the seat back must be moved forward for maintenance or cleaning, the lock pin 68 may be removed, disconnecting the hydraulic seat recline cylinder 60 from the retainer bracket 102 and the seat back 25. In this configuration the seat back 25 may be moved forward to the breakover position without interfering with the quadrant 108.

Meal Tray Assembly—Preferred Embodiment

Figure 15:
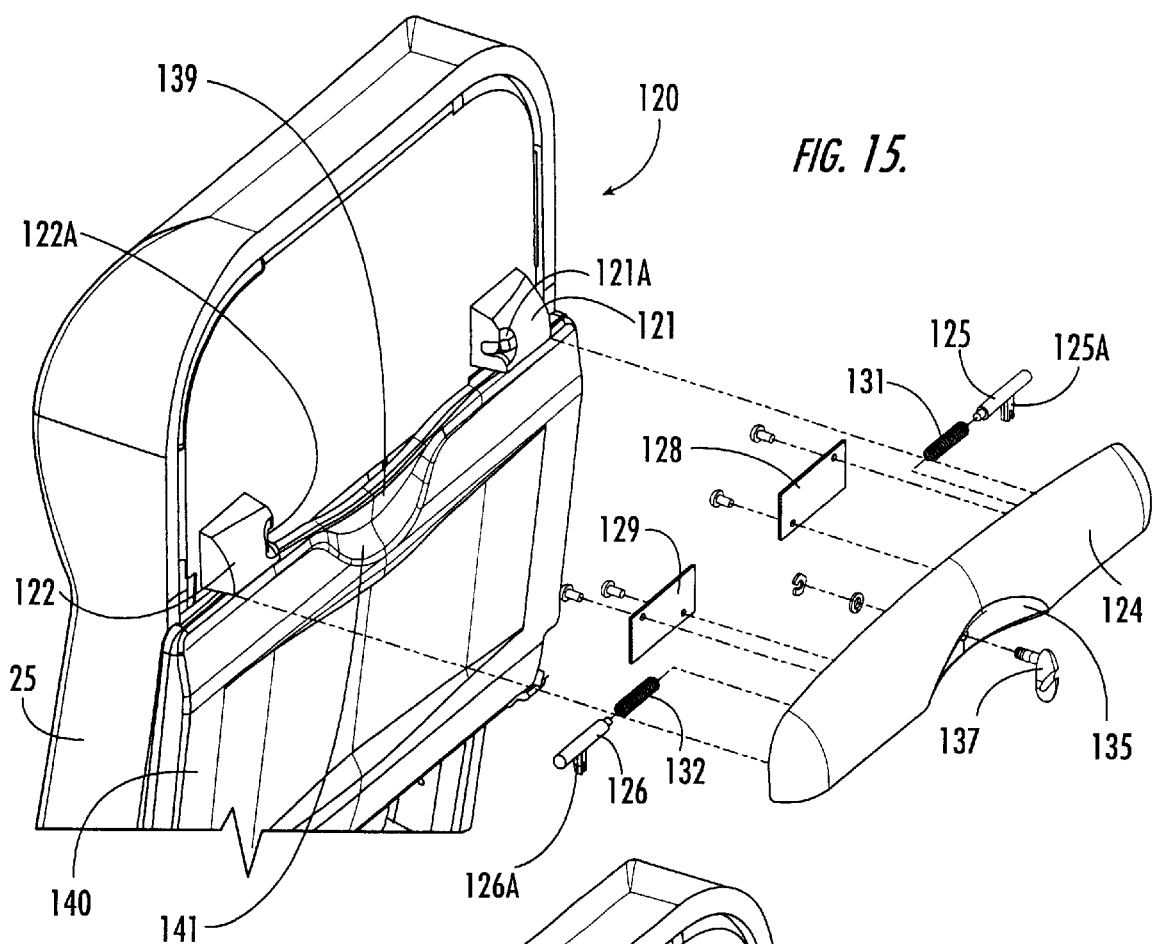
Figure 16:
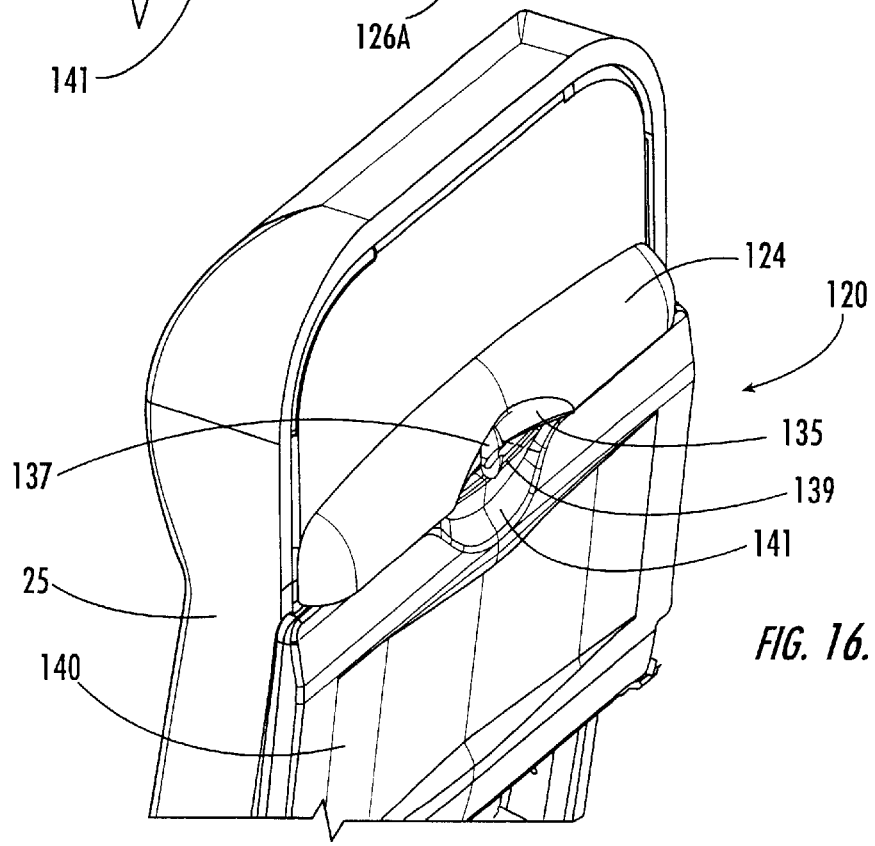

Referring now to FIG. 15, a meal tray assembly 120 according a preferred embodiment of the invention is illustrated. The meal tray assembly includes a pair of laterally spaced-apart latch plates 121, 122 connected to the back surface of the seat back pan 25A of passenger seat 11 directly above a meal tray stowage position. The latch plates 121, 122 include inwardly-facing pin retention recesses 121A, 122A, respectively. The dress cover of the seat back 25 is around the latch plates 121, 122 so as not to interfere with the latch plates 121, 122 when the dress cover is removed for cleaning or replacement.

A cross-member 124 is positioned laterally across the surface of the seat back pan 25A and releasably locked to the seat back pan 25A by a pair of locking pins 125, 126, which are mounted in recesses, not shown, in the back side of the cross-member 124 by a pair of cover plates 128, 129. The cross-member 124 is positioned over the dress cover. The locking pins 125, 126 are biased in the locked position by springs 131, 132. When the cross-member 124 is placed against the back of the seat back pan 25A and over the latch plates 121, 122, the locking pins 125, 126 extend into the retention recesses 121A, 122A and lock the cross-member 124 to the back of the seat back pan 25A.

The cross-member 124 is contoured to define a central recess 135. A rotatable "barn door" latching member 137 is positioned within the recess 135 and is movable between an extended position with the latching member 137 extending downwardly from the cross-member 124 into interfering relation with a top edge 139 of a meal tray 140, and a retracted position with the latching member 137 extending laterally to one side within the recess 135 in non-interfering relation with the top edge 139 of the meal tray 140. The meal tray 140 also includes a recess 141 which communicates with the top edge 139 of the meal tray 140. The recess 135 in the cross-member 124 and the recess 141 in the meal tray 140 collectively form a recess within which the latching member 137 resides, and thus prevents inadvertent impact from passing passengers which could cause deployment of the meal tray 140.

The locking pins 125, 126 are manually operable by downwardly-extending fingers 125A, 126 from the lower side of the cross-member 124 when the meal tray 140 is in its deployed position.

Installation is accomplished without tools. Repairs and part replacement may be made without tools and without removing the dress cover from the seat back 25.

Meal Tray Assembly-Alternative Embodiment

Figure 17:
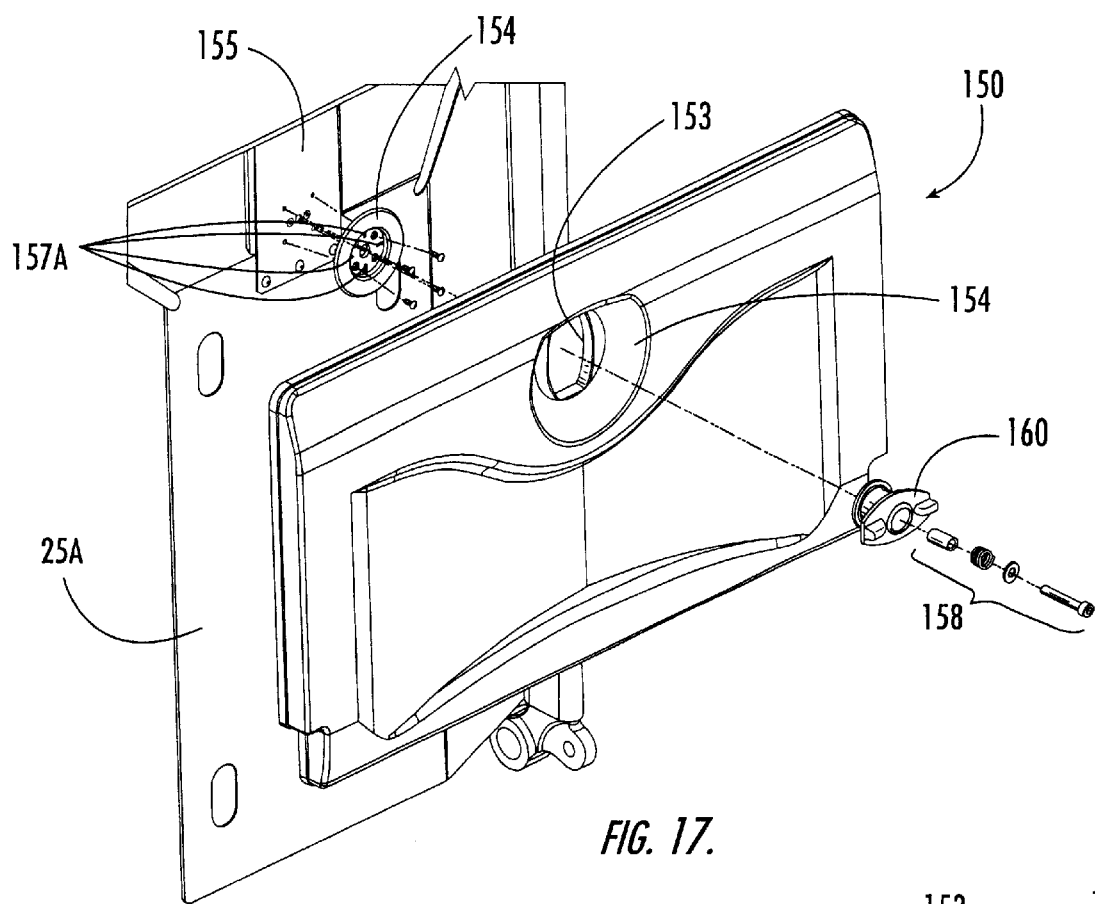
Figures 18, 19:
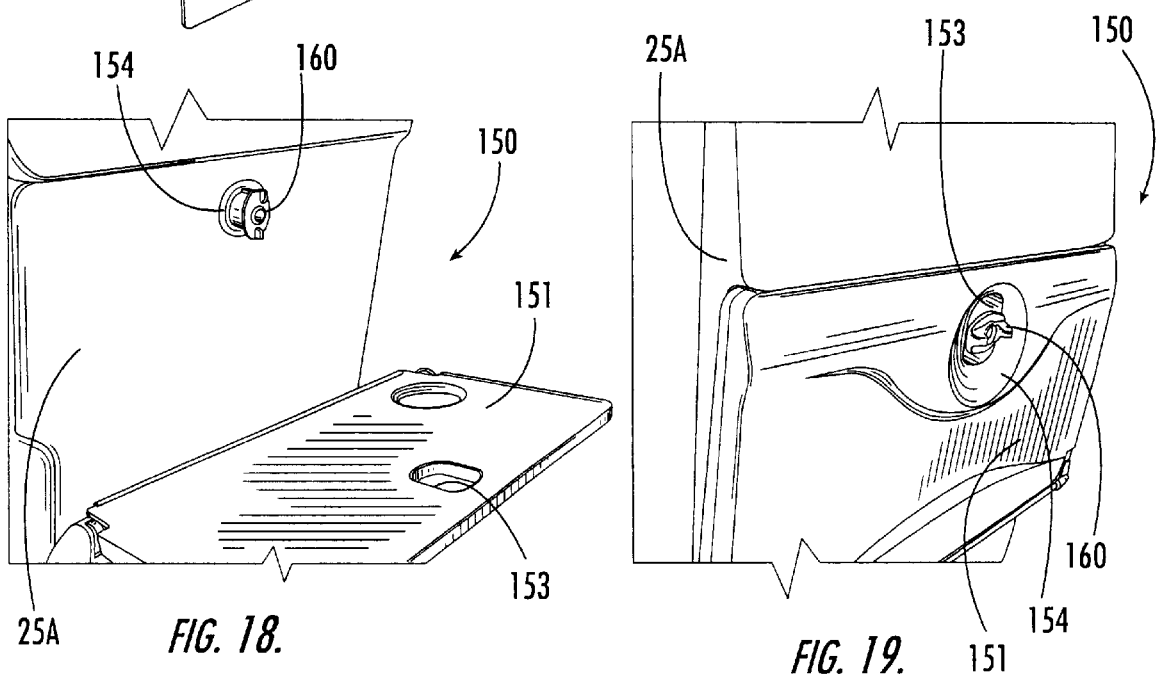

Referring now to FIGS. 17, 18 and 19, an alternative embodiment meal tray assembly 150 is shown. A meal tray 151 is mounted for movement between a stowage position flush against the back side of a seat back pan 25A, FIG. 19, and a lowered, horizontal use position, FIG. 18. An elongate latch access port 153 extends through the meal tray 151 near its top edge. Note that the latch access port is "subflush" to the bottom surface of the meal tray 151, and is surrounded by a recess 154.

A latch mounting plate 155 is secured to the back side of the seat back pan 25A, to which is mounted an annular detent plate 157. Detent plate 157 includes four 90 degree detent dimples 157A molded into the face. An elongate latch 160 is carried by the detent plate 157 by a pin assembly 158 and is rotatable between a release position, shown in FIG. 18, where the elongate latch 160 may be aligned with and extended through the elongate latch access port 153 for permitting movement of the meal tray 151 to and from the stowage position and the use position. When the meal tray 151 has been moved to the stowage position with the latch 160 extending though the latch access port 153, the latch 160 is rotated in either the clockwise or counterclockwise direction 90 degrees. The latch 160 overlaps the edge of the latch access port 153 and is caught on the edge of the meal tray 151 surrounding the latch access port 153, locking the meal tray 151 in the stowage position.

To release the meal tray 151 and allow it to be moved to the use position, the latch 160 is rotated a further 90 degrees in either direction and into alignment with the lengthwise axis of the latch access port 153. In this position, the meal tray 151 may be lowered past the latch 160 and into the use position.

Because the latch 160 captures the meal tray 151 through the latch access port 153, inadvertent disengagement of the meal tray 151 by force applied in any direction is prevented, in contrast with current "barn door" latches. In addition, the recess 154 around the latch access port 153 prevents inadvertent rotation of the latch 160 and deployment of the meal tray 151 to the use position, as might otherwise occur when a passenger brushes against the tray while moving to or from his or her own seat.

An aircraft passenger seat frame assembly is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

What is claimed is:

1. A passenger seat frame assembly, comprising:
    (a) a seat bottom chassis including a plurality of leg modules and section assembly modules, said leg modules for being attached to fixed, spaced-apart attachment points on a supporting surface;
    (b) a plurality of beam elements for being carried by said leg modules and section assembly modules; and
    (c) a plurality of clamp joints for being attached to the plurality of leg modules in a laterally offset position, each of said clamp joints including an elongate attachment element which enables attachment of said clamp joint to a left or right side of an upper portion of said leg modules, said clamp joints and said section assembly modules for receiving respective ones of the plurality of beam elements in spaced-apart relation to each other for defining a ladder frame assembly having a predetermined specified width and seat spacing.

2. A passenger seat frame assembly according to claim 1, wherein said clamp joint comprises a beam collar for extending upwardly above the leg module for receiving a beam element.

3. A passenger seat frame assembly according to claim 2, wherein said beam collar includes a split therein from one lateral side to another for enabling the beam collar to assume a relatively large diameter position for receiving the beam therethrough.

4. A passenger seat frame assembly according to claim 3, wherein said beam collar includes tightening means for closing the split with the beam positioned therein to reduce the diameter of the beam collar and thereby clamp the beam therein against axial and rotational movement.

5. A passenger seat frame assembly according to claim 3, wherein said beam collar includes a threaded bolt extending though a matingly threaded hole through said joint clamp from one side of the split to the other for increasing and decreasing the diameter of the beam collar as the bolt is turned to thus loosen or tighten the grip of the beam collar on the beam.

6. A passenger seat frame assembly according to claim 3, wherein said clamp joint comprises:
  (a) an elongate attachment element for being attached to an upper portion of the leg module, said attachment element having:
    (i) a tapered end portion with a hole therein for receiving a fastener therethrough for attaching the attachment element to the leg module;
    (ii) an enlarged intermediate portion having a pair of spaced-apart holes therein for receiving respective fasteners therethrough for attaching the attachment element to the leg module; and
  (b) a beam collar formed on an end of the attachment end remote from the tapered end portion for extending above the leg module and receiving a beam therethrough.

7. A passenger seat frame assembly according to claim 6, wherein said attachment element includes a web element between the hole in the tapered end portion and the pair of holes in the intermediate portion, said web element having a weight-reducing void therein.

8. A passenger seat, comprising:
  (a) a seat frame assembly, comprising:
    (i) a seat bottom chassis including a plurality of leg modules and section assembly modules, said leg modules for being attached to fixed, spaced-apart attachment points on a supporting surface;
    (ii) a plurality of beam elements for being carried by said leg modules;
    (iii) a plurality of clamp joints attached in a laterally offset position to a right or left side of said plurality of leg modules for receiving and clamping thereto respective ones of the plurality of beam elements to define a ladder frame assembly of spaced-apart leg modules and section assembly modules;
  (b) a seat bottom pan and a seat back pan carried by said frame assembly; and
  (c) a seat bottom cushion carried by said seat bottom pan and a seat back cushion carried by said seat back pan.

9. A passenger seat according to claim 8 and including an upholstery seat bottom dress cover positioned on said seat bottom and an upholstery seat back dress cover positioned on said seat back.

10. A passenger seat according to claim 8 and including a meal tray carried by an aft-facing side of the seat back pan and movable between a stowed position against the seat back pan and a lowered, horizontal use position.

11. A method of mounting a passenger seat to attachment points on a supporting surface, comprising the steps of:
  (a) providing:
    (i) a seat bottom chassis including a plurality of leg modules and section assembly modules, said leg modules for being attached to fixed, spaced-apart attachment points on a supporting surface;
    (ii) a plurality of beam elements for being carried by said leg modules and section assembly modules;
    (iii) a plurality of clamp joints for being attached to a left or right side of an upper portion of the leg modules for receiving respective ones of the plurality of beam elements in spaced-apart relation to each other in a plurality of predetermined specified width and seat spacing configurations;
  (b) attaching first and second ones of the plurality of clamp joints to each of the leg modules in a laterally offset position;
  (c) positioning first and second beam elements laterally through the respective first and second clamp joints to attach the leg modules together in spaced-apart relation to each other; and
  (d) positioning a section assembly module on the beam elements adjacent each leg module.

\* \* \* \* \*